US012810101B2

(12) United States Patent
Chen

(10) Patent No.: US 12,810,101 B2
(45) Date of Patent: Nov. 24, 2026

(54) SYSTEM FOR GENERATING A COLORFUL QR CODE

(71) Applicant: Chun-An Chen, Tainan (TW)

(72) Inventor: Chun-An Chen, Tainan (TW)

( * ) Notice: Subject to any disclaimer, the term of this patent is extended or adjusted under 35 U.S.C. 154(b) by 0 days.

(21) Appl. No.: 19/249,888

(22) Filed: Jun. 25, 2025

(65) Prior Publication Data

US 2026/0023946 A1 Jan. 22, 2026

(30) Foreign Application Priority Data

Jul. 22, 2024 (TW) ................................ 113127348

(51) Int. Cl.
*G06K 19/06* (2006.01)

(52) U.S. Cl.
CPC ... *G06K 19/06037* (2013.01); *G06K 19/0614* (2013.01)

(58) Field of Classification Search
CPC .................... G06K 19/06037; G06K 19/0614
USPC .......................................................... 235/494
See application file for complete search history.

(56) References Cited

U.S. PATENT DOCUMENTS 8,622,306 B2 * 1/2014 Matsumoto ............ G06K 1/121 235/494
2007/0278303 A1 * 12/2007 Cattrone .......... G06K 19/06009 235/494
2014/0027516 A1 * 1/2014 Fushiki ................ G06K 7/1408 235/494
2015/0347886 A1 * 12/2015 Fang .................. G06K 19/0614 235/494
2016/0379031 A1 * 12/2016 Fang .................... G06K 7/1443 235/462.04
2017/0076127 A1 * 3/2017 Arce ................ G06K 19/06056
2017/0076191 A1 * 3/2017 Feng ................ G06K 19/06037
2017/0185880 A1 * 6/2017 Lin .................. G06K 19/06037
2017/0243097 A1 * 8/2017 Loy ....................... G06K 7/1443
2017/0344776 A1 * 11/2017 Sharma ............ G06K 19/06112
2025/0245466 A1 * 7/2025 Nakao .............. G06K 19/06037

* cited by examiner

*Primary Examiner* — Allyson N Trail
(74) *Attorney, Agent, or Firm* — Che-Yang Chen; Law Office of Michael Chen

(57) ABSTRACT

The present invention relates to a system for generating a colorful QR code having a module configured to generate an original QR code to form an original black-and-white QR code; a module configured to determine positions of tiles to obtain coordinate positions of each tile in the original QR code; a module configured to segment the regions to segment the original QR code into regions of various sizes; a module configured to randomly distribute colors, which is used to fill various colors randomly into all blocks; a module configured to determine shapes of the tiles, which is used to set up the name of each tile; a module configured to optimize the shapes of tiles, which is used to optimize the shape of each tile; and a module configured to generate the colorful QR code to form a colorful QR code image.

18 Claims, 10 Drawing Sheets
(6 of 10 Drawing Sheet(s) Filed in Color)

FIG. 2

FIG. 3

FIG. 4

FIG. 5

FIG. 6

FIG. 7

FIG. 8

FIG. 9

FIG. 10

SYSTEM FOR GENERATING A COLORFUL QR CODE

BACKGROUND OF THE INVENTION

(a) Field of the Invention

The present invention relates to a system, and more particularly to a system for generating a colorful QR (Quick Response) code.

(b) Description of the Prior Art

The QR code is currently a code system applied widely. In comparison to the two-dimensional barcode, the QR code has the advantage of reading data quickly and storing more information, and is applied broadly to product tracking, item identification, and document management. However, the existing QR codes are all black-and-white; therefore, the QR codes are only a monotonic and dull information carrier, lacking creative design and visual attraction, which is hard to draw consumers' attention. Furthermore, the contents presented in the existing QR codes are simple, difficult to stimulate the consumers' passion of involvement, and not easy to put in precision marketing to introduce brand elements and stories to convey brand concepts and features to the consumers. Therefore, the engagement and the conversion rate are low. Finally, the safety of existing QR codes is low that the QR codes can be attacked and tampered with maliciously; hence, a certain safety hazard exists in the QR codes.

SUMMARY OF THE INVENTION

Accordingly, in terms of the issues and insufficiencies in the existing QR codes, after constant experiments and researches, the present invention has been developed to improve the existing shortcomings of QR codes.

The primary object of the present invention is to provide a system for generating a colorful QR code. The system can form a colorful QR code to increase the aesthetic and the safety of QR code.

To achieve the abovementioned object, the present invention provides the system for generating a colorful QR code, comprising a module configured to generate an original QR code to form an original black-and-white QR code; a module configured to determine positions of tiles, which is used to obtain coordinate positions of all black tiles in the original QR code; a module configured to segment the regions, which is used to segment the original QR code into regions of various sizes; a module configured to randomly distribute colors, which is used to fill colors randomly into all blocks; a module configured to determine shapes of the tiles, which is used to set up the name of each tile; a module configured to optimize the shapes of tiles, which is used to optimize the shape of each tile; and a module configured to generate the colorful QR code to form a colorful QR code image.

In the said system for generating a colorful QR code, the function library qrcodejs is utilized in the module configured to generate an original QR code, converting a text or other data into a QR code image to form the original QR code.

In the said system for generating a colorful QR code, a module configured to determine the positions of tiles further includes a module configured to segment the image, wherein the image is segmented based upon the sizes of square tiles; a module configured to identify the black tile, wherein the positions of black tiles are extracted and recorded; and a module configured to record the coordinates, wherein the coordinate information of each black tile is stored in an array.

In the said system for generating a colorful QR code, a module configured to segment the regions utilizes the DFS (Depth-First Search) algorithm to visit the entire QR code, so as to segment the QR code into regions of various sizes.

For the said system for generating a colorful QR code, through a modularized design and utilizing a method for filling colors randomly, a color is randomly selected from a color array to fill into the tile, in the module configured to randomly distribute colors.

In the said system for generating a colorful QR code, a module configured to determine the shapes of tiles utilizes a nine-box grid analysis method, combining the edge detection and connected component analysis technique, to classify the tiles; wherein, through a logical judgment, the corresponding names to the tiles are set up, and the relative relationships among the neighboring eight tiles are analyzed with respect to a target tile as the center to set up a corresponding name to each relationship through the logical judgment. The tiles are separated into three categories, and each tile is assigned with a specific name.

The said system for generating a colorful QR code further includes a step of positioning marker outer frame and internal modularization, wherein an algorithm is utilized to automatically set up three positioning maker coordinates, and patterns of the positioning marker outer frame and an internal part are changed individually, so as to keep the scannability of the QR code; and a module configured to design the positioning marker outer frame, wherein an algorithm is utilized to set up three positioning maker coordinates, and the shapes of all tiles are optimized by a specific algorithm to improve the entire visual aesthetic.

By the abovementioned technical approaches, the present invention combines the convenience of function library qrcodejs with the accuracy of image processing technique, optimizing every step through the modularization design to improve the operation efficiency. In addition, through the random color filling and the shape changing, the colorful QR code can be more diversified and vivid, and can be prevented from being attacked and tampered with maliciously to improve the safety in using the QR code.

To enable a further understanding of the said objectives and the technological methods of the invention herein, the brief description of the drawings below is followed by the detailed description of the preferred embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 2:
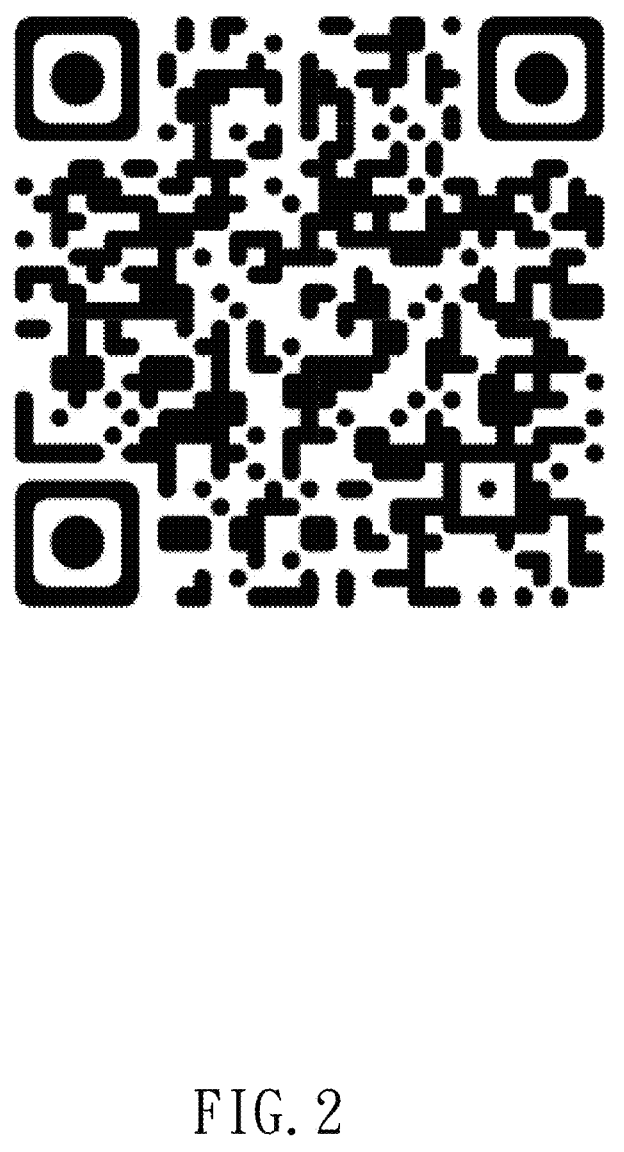

FIG. 2 shows an original QR code generated by the present invention.

FIG. 3 shows a QR code after the present invention determines positions of tiles.

Figure 4:
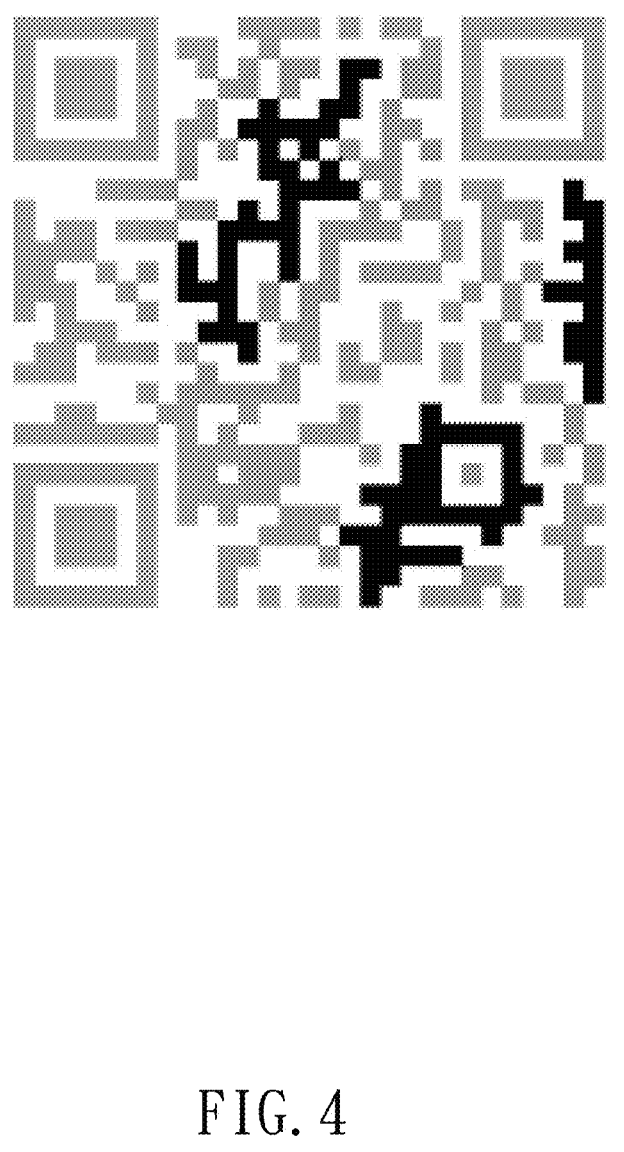

FIG. 4 shows a QR code after the present invention segments the QR code into regions.

FIG. 5 shows a QR code after the present invention distributes colors randomly.

FIG. 6 shows a QR code after the present invention determines shapes of the tiles.

Figure 7:
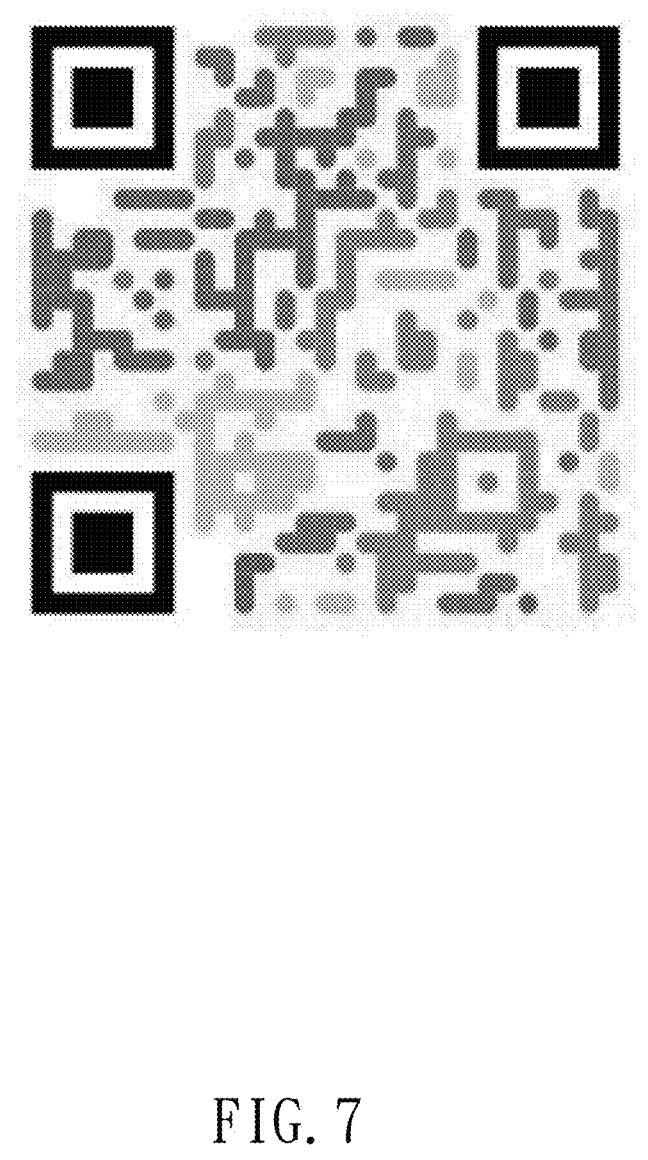

FIG. 7 shows a QR code after the present invention optimizes the tiles.

Figure 8:
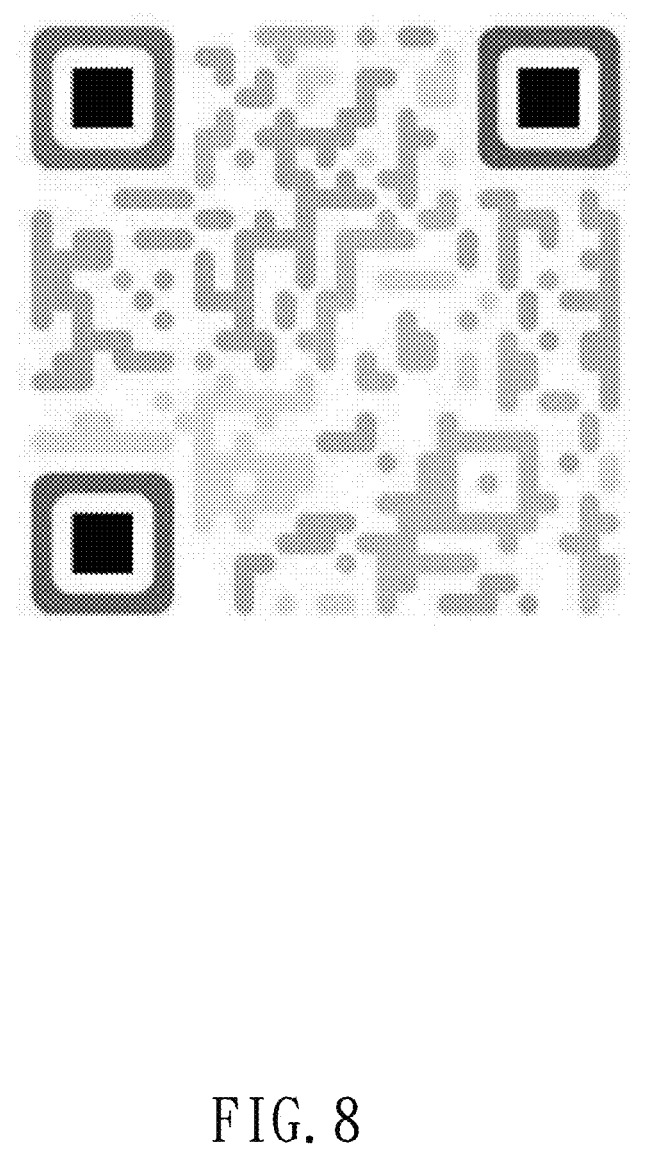

FIG. 8 shows a QR code after the present invention carries out a step of positioning marker outer frame and internal modularization.

FIG. 9 shows a QR code after the present invention carries out designing the positioning marker outer frame.

Figure 10:
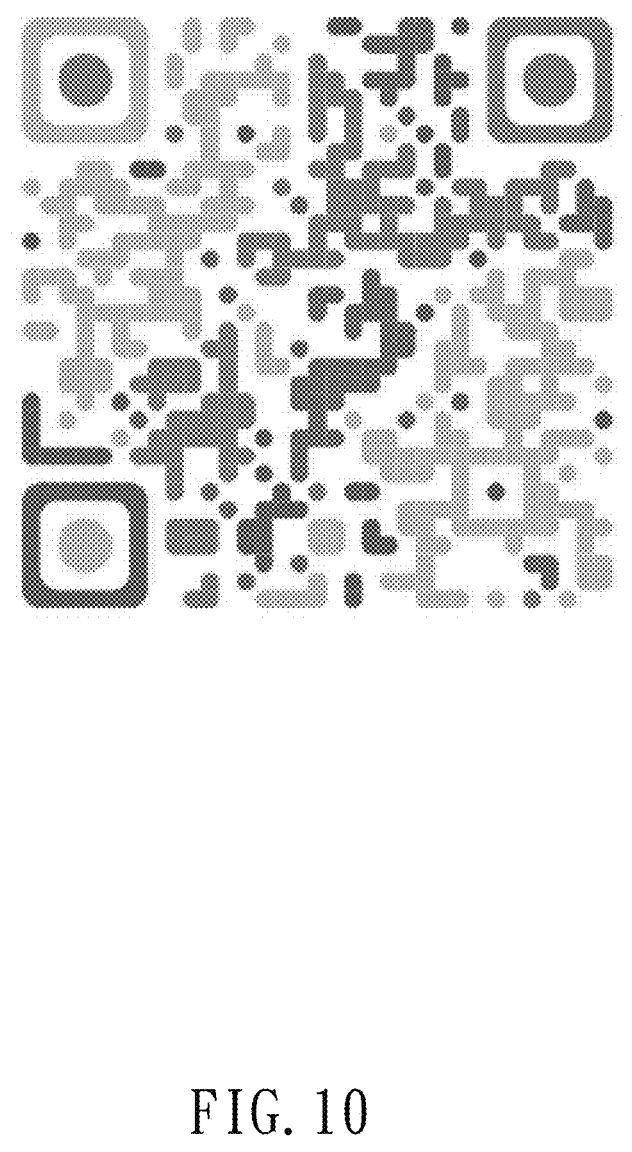

FIG. 10 shows a colorful QR code generated by the present invention.

DETAILED DESCRIPTION OF THE PREFERRED EMBODIMENTS

Figure 1:
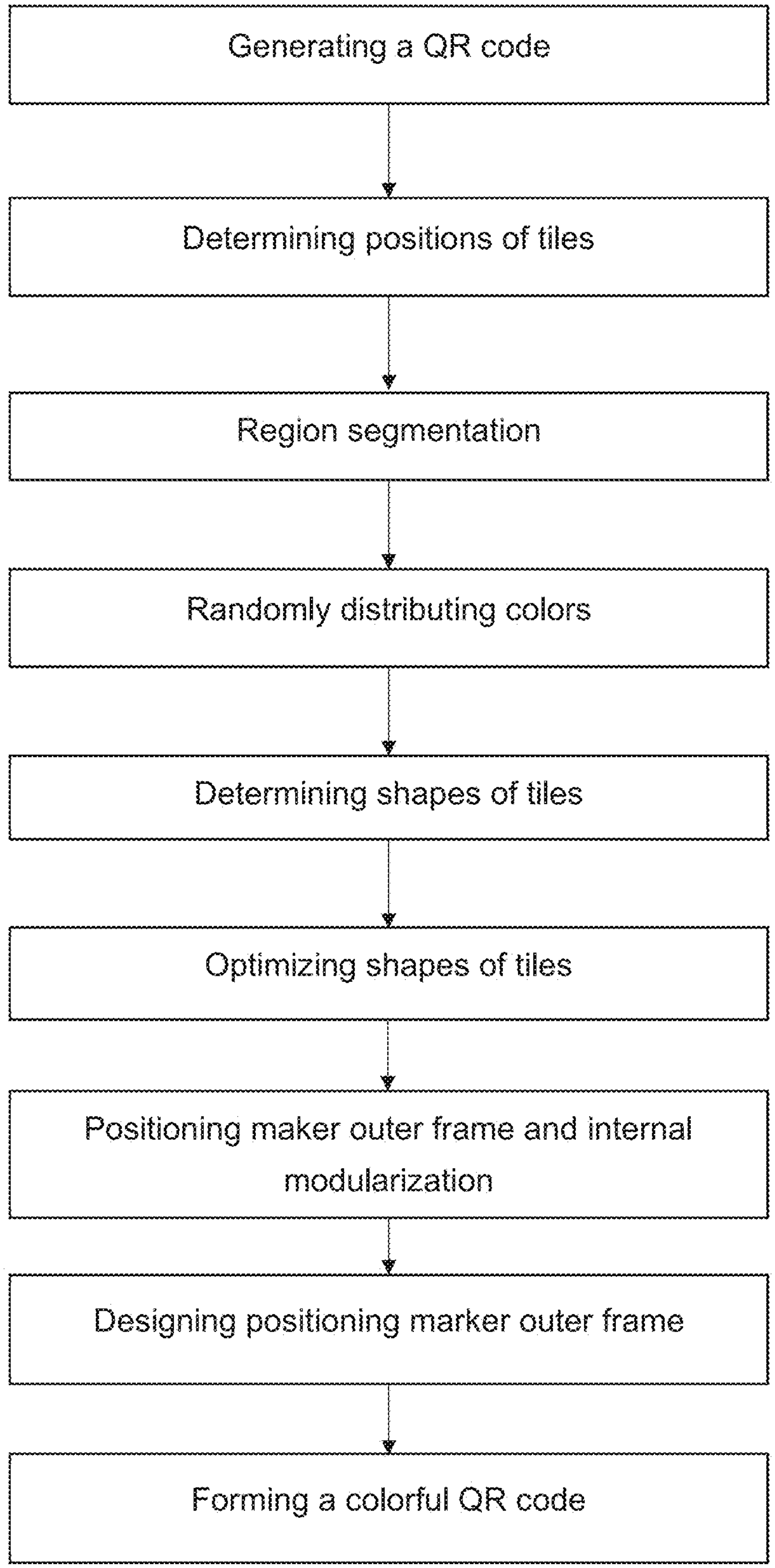
FIG. 1 shows a flow diagram of execution steps of the system of the present invention.

The present invention relates to a system for generating a colorful QR code. As shown in FIG. 1, the system of the present invention is used primarily to execute following steps:

1. Generating a QR Code
   A function library qrcodejs is used to convert a text or other data into a QR code image to form an original QR code, as shown in FIG. 2.
2. Determining Positions of Tiles
   Referring to FIG. 3, this is a pre-processing to a step of randomly distributing colors. Through analyzing the QR code image to perform an image processing, and by using the image processing technique, positions of black tiles in the QR code are extracted and determined to obtain the coordinate information (x, y) of each black tile, followed by recording the coordinate information in an array. This can be implemented by performing the image analysis and processing to the image, verifying the coordinate positions of each black tile in the QR code. The size of each black tile is extracted by an automatic algorithm, with the size of tile referring to the size (how many pixels in length and width) of each small square in the QR code. In addition, the generated QR code is conducted with the image analysis to calculate automatically the size of each black tile and extract the accurate coordinates of each black tile. This step further includes (1) image segmentation—segmenting based upon the sizes of square tiles; (2) black tile identification—extracting and recording the positions of black tiles; and (3) coordinate recording-saving the coordinate information of each black tile into an array.
3. Region Segmentation
   As shown in FIG. 4, the position, size, and coordinate information of the black tile are obtained from the previous step, and the entire QR code is visited by the DFS algorithm to determine the relative relationships among neighboring blocks, record the visited tiles, and search for the tiles that have not been visited yet. The neighboring blocks are assigned to be a same region; and finally, the QR code is segmented into regions of various sizes.
4. Randomly Distributing Colors
   Referring to FIG. 5, based upon the previous step, colors are distributed randomly. In this step, a color is randomly selected from a color array through the modularized design and utilizing a random color filling method. This step utilizes a modularized input design to improve the flexibility and efficiency for distributing colors.
5. Determining Shapes of Tiles
   Referring to FIG. 6, according to the extracted information, a classification processing is performed. Based upon the relationships among a target tile and the neighboring tiles, and through a logical judgment, a corresponding name is set up. In addition, the edge detection and connected component analysis are utilized to find out a specific position to define the name of each tile. This step primarily uses a nine-box grid analysis method, combining the edge detection and connected component analysis technique, to classify the tiles. Through the logical judgment, the corresponding name is set up. In addition, the relationships among the neighboring eight tiles are analyzed with respect to the target tile as the center, setting up a corresponding name to each relationship through the logical judgment, separating the tiles into three categories, and assigning a specific name to each tile.
6. Optimizing the Shapes of Tiles
   Referring to FIG. 7, based upon the processing of the previous step, the shape of each tile is optimized by an algorithm to improve the entire visual aesthetic.
7. Positioning Maker Outer Frame and Internal Modularization
   Referring to FIG. 8, three positioning marker coordinates are set up automatically by an algorithm, and a modularization algorithm is invoked to change patterns of the positioning marker outer frame and the internal part individually, so as to keep the scannability of the QR code.
8. Designing the Positioning Marker Outer Frame
   Referring to FIG. 9, three positioning marker coordinates are set up automatically by an algorithm, and the shapes of all tiles are optimized by a specific algorithm to improve the entire visual aesthetic.
9. Forming a colorful QR code
   According to the Abovementioned Result of Color Distribution, a Colorful QR code image is generated, wherein each black tile is assigned with a corresponding color and shape, allowing the QR code to be more attractive and identifiable, as shown in FIG. 10.

Accordingly, the present invention combines the convenience of function library qrcodejs and the accuracy of image processing technique, optimizing each step through the modularized design to improve the operation efficiency. Through the random color filling and the shape changing, the colorful QR code is more diversified and vivid. The present method can be applied broadly to the manufacturing of all kinds of QR code, such as advertising design, brand management, product packaging or artistic creation, bringing new possibility to the development of QR code technology. In addition, the colorful QR code is safer and not easy to be attacked and tampered with maliciously, which can further improve the safety in using the colorful QR code.

Furthermore, the present system can be applied to computers, servers, or smart phones, increasing the practicality of the present invention.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A system for generating a colorful QR (Quick Response) code, comprising a module configured to generate an original QR code, which is used to form an original black-and-white QR code;

a module configured to determine positions of tiles, which is used to obtain coordinate positions of each black tile in the original QR code;

a module configured to segment regions, which is used to segment the original QR code into regions of various sizes;

a module configured to randomly distribute colors, which is used to fill various colors randomly into all blocks;

a module configured to determine shapes of the tiles, which is used to set up a name of each tile;

a module configured to optimize the shapes of tiles, which is used to optimize the shape of each tile; and a module configured to generate a colorful QR code, which is used to form a colorful QR code image.

2. The system for generating a colorful QR code, according to claim 1, wherein in the module configured to generate an original QR code, a function library qrcodejs is utilized to convert a text or other data into a QR code image to form the original QR code.

3. The system for generating a colorful QR code, according to claim 1, wherein the module configured to determine the positions of tiles further includes a module configured to segment the image, with the image being segmented based upon the sizes of square tiles; a module configured to identify the black tile, with the positions of black tiles being extracted and recorded; and a module configured to record the coordinates, with the coordinate information of each black tile being saved into an array.

4. The system for generating a colorful QR code, according to claim 2, wherein the module configured to determine the positions of tiles further includes a module configured to segment the image, with the image being segmented based upon the sizes of square tiles; a module configured to identify the black tile, with the positions of black tiles being extracted and recorded; and a module configured to record the coordinates, with the coordinate information of each black tile being saved into an array.

5. The system for generating a colorful QR code, according to claim 3, wherein in the module configured to segment the regions, a DFS (Depth-First Search) algorithm is utilized to visit an entire QR code, so as to segment the QR code into regions of various sizes.

6. The system for generating a colorful QR code, according to claim 4, wherein in the module configured to segment the regions, a DFS (Depth-First Search) algorithm is utilized to visit an entire QR code, so as to segment the QR code into regions of various sizes.

7. The system for generating a colorful QR code, according to claim 5, wherein in the module configured to randomly distribute colors, a color is randomly selected from a color array to be filled into a tile, through a modularized design and using a random color filling method.

8. The system for generating a colorful QR code, according to claim 6, wherein in the module configured to randomly distribute colors, a color is randomly selected from a color array to be filled into a tile, through a modularized design and using a random color filling method.

9. The system for generating a colorful QR code, according to claim 7, wherein in the module configured to determine the shapes of tiles, a nine-box grid analysis method is utilized, combing an edge detection and connected component analysis technique, to classify the tiles, setting up a corresponding name through a logical judgment, analyzing relative relationships among eight neighboring tiles with respect to a target tile as a center, assigning a corresponding name to each relationship through the logical judgment, separating the tiles into three categories, and assigning a specific name to each tile.

10. The system for generating a colorful QR code, according to claim 8, wherein in the module configured to determine the shapes of tiles, a nine-box grid analysis method is utilized, combing an edge detection and connected component analysis technique, to classify the tiles, setting up a corresponding name through a logical judgment, analyzing relative relationships among eight neighboring tiles with respect to a target tile as a center, assigning a corresponding name to each relationship through the logical judgment, separating the tiles into three categories, and assigning a specific name to each tile.

11. The system for generating a colorful QR code, according to claim 1, wherein in the module configured to segment the regions, the DFS algorithm is utilized to visit an entire QR code, so as to segment the QR code into regions of various sizes.

12. The system for generating a colorful QR code, according to claim 2, wherein in the module configured to segment the regions, the DFS algorithm is utilized to visit an entire QR code, so as to segment the QR code into regions of various sizes.

13. The system for generating a colorful QR code, according to claim 1, wherein in the module configured to randomly distribute colors, a color is randomly selected from a color array to be filled into a tile, through a modularized design and using a random color filling method.

14. The system for generating a colorful QR code, according to claim 2, wherein in the module configured to randomly distribute colors, a color is randomly selected from a color array to be filled into a tile, through a modularized design and using a random color filling method.

15. The system for generating a colorful QR code, according to claim 1, wherein in the module configured to determine the shapes of tiles, a nine-box grid analysis method is utilized, combing an edge detection and connected component analysis technique, to classify the tiles, setting up a corresponding name through a logical judgment, analyzing relative relationships among eight neighboring with respect to a target tile as a center, assigning a corresponding name to each relationship through the logical judgment, separating the tiles into three categories, and assigning a specific name to each tile.

16. The system for generating a colorful QR code, according to claim 2, wherein in the module configured to determine the shapes of tiles, a nine-box grid analysis method is utilized, combing an edge detection and connected component analysis technique, to classify the tiles, setting up a corresponding name through a logical judgment, analyzing relative relationships among eight neighboring with respect to a target tile as a center, assigning a corresponding name to each relationship through the logical judgment, separating the tiles into three categories, and assigning a specific name to each tile.

17. The system for generating a colorful QR code, according to claim 1, further comprising a step of positioning marker outer frame and internal modularization, wherein an algorithm is utilized to automatically set up three positioning marker coordinates to change patterns to the positioning marker outer frame and an internal part individually, keeping a scannability of the QR code; and a module configured to design the positioning marker outer frame, wherein an algorithm is utilized to automatically set up three positioning marker coordinates, and the shapes of all tiles are optimized using a specific algorithm, so as to improve an entire visual aesthetic.

18. The system for generating a colorful QR code, according to claim 2, further comprising a step of positioning marker outer frame and internal modularization, wherein an algorithm is utilized to automatically set up three positioning marker coordinates to change patterns to the positioning marker outer frame and an internal part individually, keeping a scannability of the QR code; and a module configured to design the positioning marker outer frame, wherein an algorithm is utilized to automatically set up three positioning marker coordinates, and the shapes of all tiles are optimized using a specific algorithm, so as to improve an entire visual aesthetic.

* * * * *